United States Patent
Drouillard et al.

[11] Patent Number: 5,897,797
[45] Date of Patent: * Apr. 27, 1999

[54] PRODUCE MARKING SYSTEM

[75] Inventors: Greg Drouillard, Lakeland, Fla.;
Rowland W. Kanner, Gunterville, Ala.

[73] Assignee: Atrion Medical Product. Inc., Arab, Ala.

[ * ] Notice: This patent is subject to a terminal disclaimer.

[21] Appl. No.: 08/744,620

[22] Filed: Nov. 6, 1996

Related U.S. Application Data

[63] Continuation-in-part of application No. 08/334,563, Nov. 4, 1994, Pat. No. 5,660,747.

[51] Int. Cl.$^6$ .................................................. B23K 26/00
[52] U.S. Cl. ........................................ 219/121.68; 101/3.1
[58] Field of Search .................................... 347/171, 256; 101/3.1, 4; 400/120.01, 124.01; 219/121.68, 121.69, 121.85; 209/577; 426/237; 56/328.1

[56] References Cited

U.S. PATENT DOCUMENTS

| | | | |
|---|---|---|---|
| 4,043,105 | 8/1977 | Cochran | 56/328.1 |
| 4,636,043 | 1/1987 | Bellar | 219/121.68 |
| 4,839,181 | 6/1989 | MacMurray et al. | 426/237 |
| 5,021,631 | 6/1991 | Ravellat | 219/121.68 |
| 5,120,928 | 6/1992 | Piliero | 219/121.68 |
| 5,198,843 | 3/1993 | Ito et al. | 347/256 |
| 5,316,397 | 5/1994 | Robertson et al. | 101/3.1 |
| 5,526,119 | 6/1996 | Blit et al. | 209/577 |
| 5,660,747 | 8/1997 | Drouillard et al. | 219/121.69 |

FOREIGN PATENT DOCUMENTS

| | | | |
|---|---|---|---|
| 2654662 | 5/1991 | France . | |
| 3722176 | 1/1989 | Germany | 219/121.85 |
| 3836821 | 5/1990 | Germany . | |
| 58-90985 | 5/1983 | Japan . | |
| 1108940 | 4/1989 | Japan . | |
| 1-196259 | 8/1989 | Japan . | |
| 2-60552 | 3/1990 | Japan . | |
| 5146887 | 6/1993 | Japan . | |
| 2033185 | 3/1993 | Spain . | |

OTHER PUBLICATIONS

Lumonics brochure for the LightWriter® SP/SPe, No Publication Date.
Lumonics brochure for the LightWriter® $CO_2$ No Publication Date.
Lumonics brochure for the LaserMark 960, No Publication Date.
Lumonics brochure—The LaserMark BD–60 Programmable Beam Delivery Unit for Large Area Marking, No Publication Date.
Lumonics brochure for the LightWriter ® No Publication Date.

*Primary Examiner*—Geoffrey S. Evans
*Attorney, Agent, or Firm*—Trexler,Bushnell,Giangiorgi & Blackstone,Ltd.

[57] ABSTRACT

A produce (e.g. fruits and vegetables) marking system is used to etch the skin of a piece of produce with an identifying mark. The first embodiment of the system uses a laser to emit a high intensity light beam to form the identifying mark. The second and third embodiments of the system use a dot matrix printer head. In the second embodiment, the pins of the printer head directly contact the produce skin to etch an area of the skin to form the identifying mark. In the third embodiment, a thermally conductive ribbon member is placed between the printer head and the produce. The pins of the printer head impact the ribbon member thereby forming a hot spot on the ribbon member, which in turn, etches the skin of the produce to form the identifying mark.

29 Claims, 17 Drawing Sheets

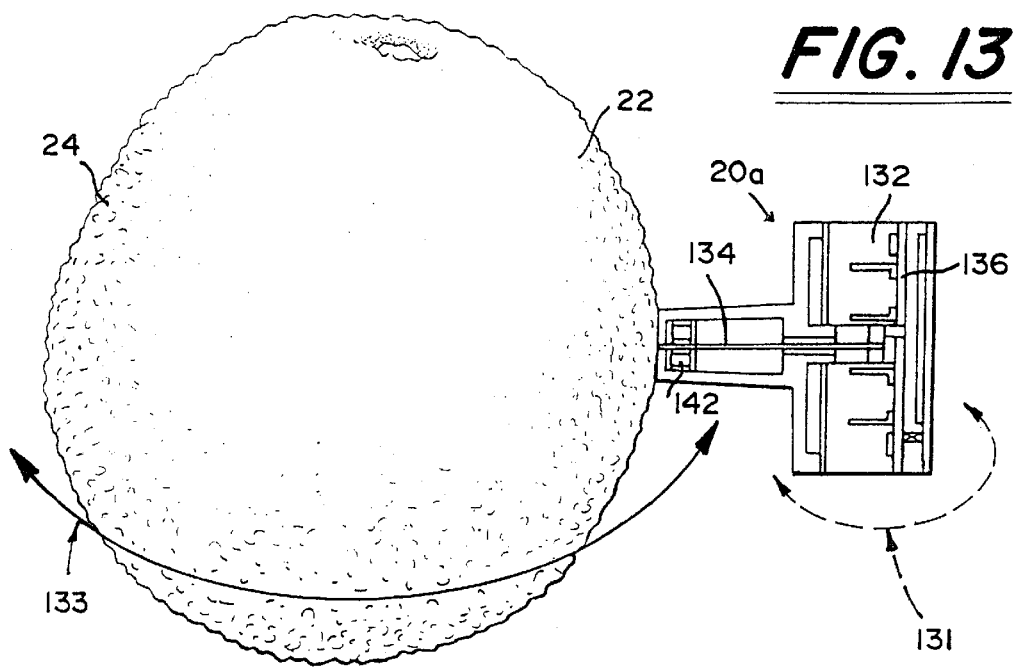
*FIG. 13*
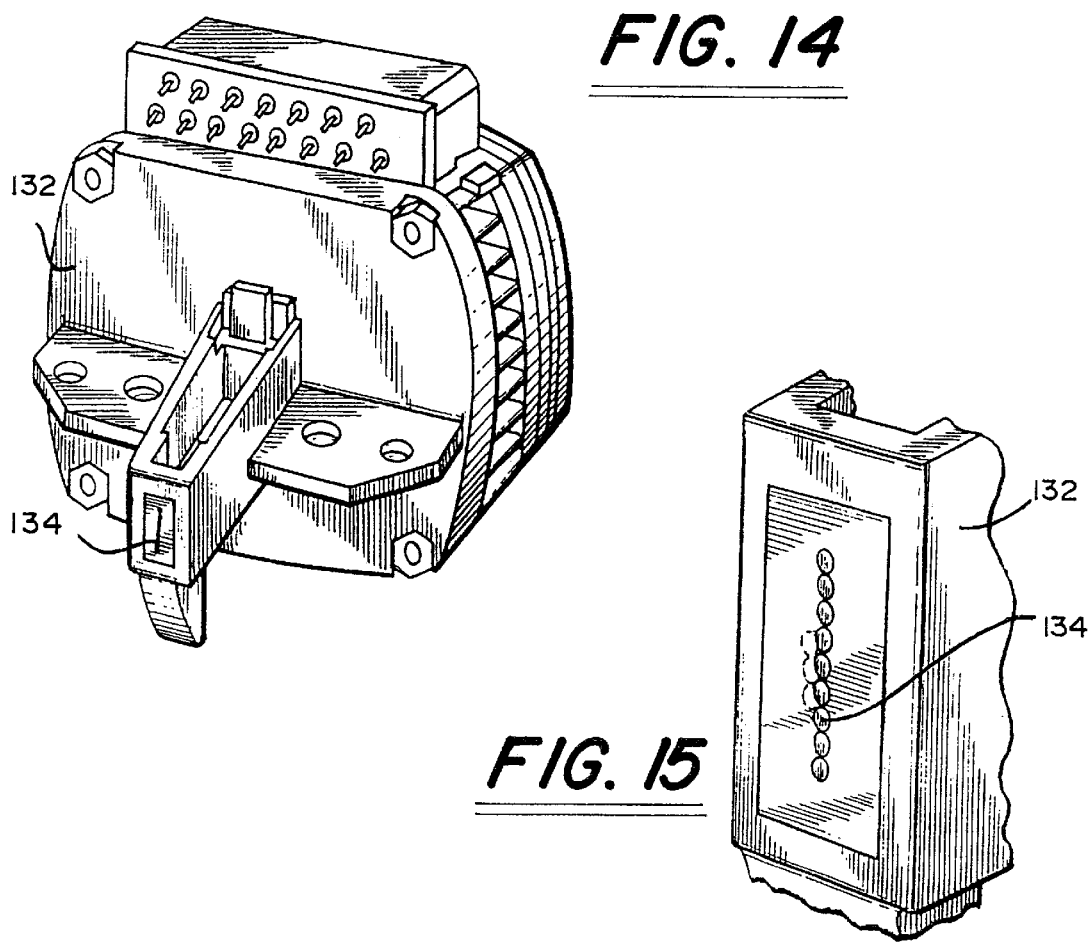
*FIG. 14*
*FIG. 15*

GREEN PEPPER

APPLE

GRAPEFRUIT

ONION

PRODUCE MARKING SYSTEM

This application is a continuation-in-part application of U.S. patent application Ser. No. 08/334,563 filed on Nov. 4, 1994, now U.S. Pat. No. 5,660,747, and entitled "Produce Marking System".

BACKGROUND OF THE INVENTION

This invention is generally directed to an apparatus and method for marking produce, i.e. fruits and vegetables, with identifying marks using initially "ink free" techniques. More particularly, the invention contemplates a produce marking system utilizing initially "ink free" techniques ranging from lasers to dot matrix printers. The present invention provides a less expensive, inventory free, ecologically friendly, rapidly changeable option to packers for replacement of currently employed adhesive label systems which often clog packing line equipment, juice screens and display cases or may inadvertently be eaten by the consumer.

The Grocers Association requires that a number, called a price look-up ("P.L.U.") number, is put on all types of fruits, especially citrus, and some types of vegetables which are sold in a loose state, as opposed to bagged or plastic-wrapped produce. The Grocers Association requires this number so it can merchandise different sizes and types of produce. The P.L.U. number represents different varieties, sizes (normally two; large, small) and geographic growing areas within the United States. Further labeling may be undertaken by an individual packer to identify brand names or specific growing region, for example, Indian River grapefruit, Vidalia onion. Some states mandate that the "country of origin" be noted, for example, tomatoes from Mexico, apples from Chile. The P.L.U. marking requirement is not limited to the United States.

P.L.U. numbers allow a check-out clerk to identify fruits and vegetables quickly and easily. A store may have the P.L.U. numbers and the associated identifying data entered into a computer. To access the data, the clerk need only read the number on the produce and enter it into the computer.

Prior to the usage of P.L.U. numbers, grocers often lost money from giveaways that resulted from mixed sizes or types of produce. The check-out clerk was always told to err on the side of the customer. This mispricing happened often which resulted in large losses for the grocery stores. The P.L.U. number aids the check-out clerk from mispricing the produce that looks the same but has a different quality value. This minimizes loss of money to a grocer due to "giveaways" that result from mixed sizes or types, and minimizes time at the check-out counter which have previously resulted from price checks. The usage of the P.L.U. numbers also aids in inventory control which previously had been a problem area.

To mark the produce with the P.L.U. number, typically, a small adhesive label is placed on the produce at the packinghouse by the packer. Labels, however, are costly and complex to manufacture and attach to the produce. The labels are expensive because the packer must purchase large inventories of labels to run different types of produce on the same packing line. There must be a 90–95% success rate of the label adhering to the produce and presently the labels are only achieving 80–85%, not including what falls off after labeling in the packinghouse and the grocery store. In addition, the labels must be stored in a dry, cool environment in a room built with HVAC controls.

Adhesive labels present several other problems, for example, when the packer changes the type of produce they are packing, the packer must physically change all of the labels so that the correct label is eventually attached to the produce which requires downtime and manpower to set up. The prior art adhesive label systems have a high operational maintenance cost. A person must be regularly assigned to the label machine to keep it operational. The labeler requires the spools of labels to be replaced when empty, and there is a need to unplug the applicator when it becomes clogged with labels.

The adhesive on the labels also has the tendency to gum up on the labeler machine, and be deposited on the belts, rollers, and any other associated machinery. These stray labels have to be cleaned from the equipment everyday. Over time, the adhesive builds up on the equipment after the stray labels are continually removed. Furthermore, when processing plants receive labeled fruit to process, i.e. squeezing fruit to make juice, the labels may clog the extractors. This requires down-time due to cleaning and maintenance.

Furthermore, the adhesive labels are not a "green" product. There is garbage from the adhesive backing along with the packaging of the label rolls. The labels use adhesive for label application, as well as using more energy for special storage.

Additionally, with the current prior art adhesive label system, it is not possible to make on-line P.L.U. number changes. Therefore, at least two rows of labelers are required to put down the proper adhesive label on the produce. For example, if large and small produce are being distinguished with P.L.U. adhesive labels, then two labelers must be used in line to apply the proper label to the produce.

In the grocery store, adhesive labels come off of the produce and sometimes stick to the wrong produce or the floor or the bins in which the produce is stored. This necessitates the need for regular cleaning of the adhesive labels.

With regard to consumers, many consumers do not care for adhesive labels. Some customers do not like having to peel the label off the produce. In addition, customers sometimes inadvertently eat or bite into the adhesive label.

Applicant believes that attempts have been made to directly mark produce with an ink jet printer using edible ink. This type of marking system, however, requires use of an ink which is not sufficiently permanent and smudges.

Additionally, lasers have been used to mark foodstuffs, such as that disclosed in German Patent No. DE 3836821. This type of laser marking system for foodstuffs employs the use of a scanning mask (a stencil of the desired mark) which controls the extent of the contact of the laser light beam on the foodstuff and thus, is an inefficient system. The prior art masking systems were not concerned with direct marking on the delicate, extremely sensitive skin of a perishable product such as fruits and vegetables.

The success of any labeling that would be acceptable to grocers and consumers depends on a several criteria. First, the label has to be easy to read so as not to slow down the check-out clerk when checking the P.L.U. number. Second, the label must have at least a 90–95% success rate of being labeled. Third, the label must be low in cost to the grocer and to the consumer. Fourth, the label must be visually acceptable to the consumer. Fifth and finally, the marking system must not damage the produce.

The present invention is intended to present a novel produce marking system which uses initially "ink free" techniques to provide a label on produce which meets these criteria. In addition, the present invention is intended to overcome or minimize known and inherent problems in prior art produce marking techniques.

OBJECTS AND SUMMARY OF THE INVENTION

A general object of the present invention is to provide a produce marking system which uses initially "ink free" marking techniques.

An object of the present invention is to provide a produce marking system which uses laser energy to etch the skin of the produce with an identifying mark without the use of a scanning mask, and without damaging the skin of the produce to an extent that would produce spoilage or render the appearance of the produce unacceptable to the purchaser.

Another object of the present invention is to provide a produce marking system that uses a printer head of the general type and kind found in dot matrix printers to etch the skin of the produce with an identifying mark, without the transfer of ink to the produce skin.

A further object of the present invention to provide a produce marking system which is flexible, reliable and efficient.

Briefly, and in accordance with the foregoing, the present invention discloses a novel produce marking system and method of using the same to mark the skin of a piece of produce with an identifying mark. The first embodiment of the system disclosed herein uses a laser to emit a high intensity light beam to etch the skin of the produce to form the identifying mark. The laser path and intensity is precisely controlled to form the mark. The second and third embodiments of the system disclosed use a printing head of the type found in a dot matrix printer. In the second embodiment, the pins of the printer head, which are at an elevated temperature due to friction or from a separate heating source, directly contact the skin of the produce to etch an area of the skin to form the identifying mark. In the third embodiment, a thermally conductive ribbon is placed between the printer head and the produce. The pins of the printer head impact the ribbon thereby forming a hot spot on the ribbon, which in turn, etches the skin of the produce to form the identifying mark.

BRIEF DESCRIPTION OF THE DRAWINGS

The file of this patent contains at least one drawing executed in color. Copies of this patent with color drawing(s) will be provided by the Patent Office upon request and payment of necessary fee.

The organization and manner of the structure and operation of the invention, together with further objects and advantages thereof, may best be understood by reference to the following description, taken in connection with the accompanying drawings, wherein like reference numerals identify like elements in which:

FIG. 13 is a top, schematic view of a produce marking system which incorporates the features of a second embodiment of the present invention;

FIG. 14 is a perspective view of a 9-pin dot-matrix-type printer head which may be employed in the second and third embodiments of the present invention;

FIG. 15 is an partial, enlarged, perspective view of the dot matrix printer head of FIG. 14 illustrating the pin array;

DETAILED DESCRIPTION OF THE PREFERRED EMBODIMENT

Figure 1:
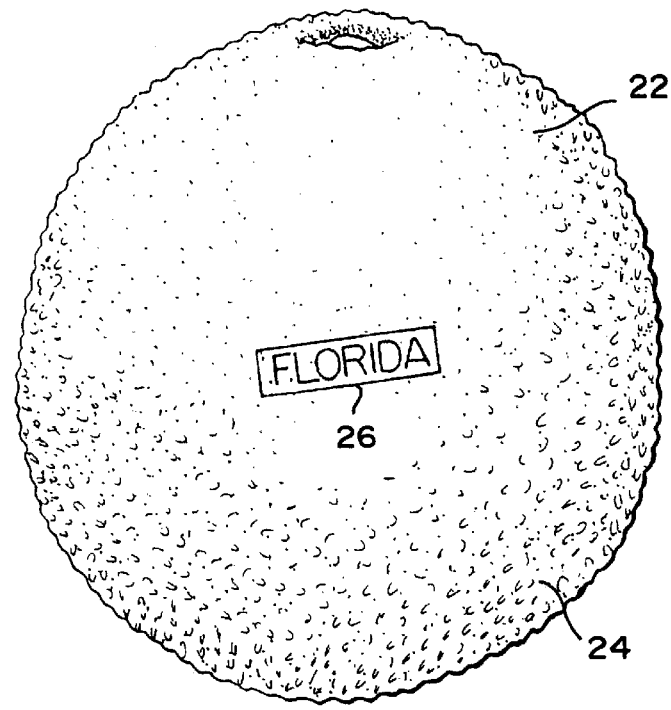
FIG. 1 is an elevational view of a piece of produce which has been marked with an identifying mark made by one of the embodiments of the novel produce marking system disclosed herein.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

Novel embodiments of a produce marking system 20, 20a, 20b are shown and disclosed herein. The embodiments 20, 20a, 20b of the produce marking system use initially "ink free" techniques to mark the skin 22 of a piece of produce 24 with an identifying mark or marks 26. By using the term "ink free," this means that ink, edible or inedible, is not used in the initial process to mark the piece of produce 24. Also, it is to be understood that by using the term "skin" herein, that is synonymous with the terms, "peel," "rind" and the like.

The novel embodiments 20, 20a, 20b of the produce marking system of the present invention can be used to mark a variety of fruits and vegetables. While an orange is shown in the drawings, other fruits can be marked using the system and method described herein, ranging from thick-skinned fruits such as grapefruits and tangerines to thin-skinned fruits such as tomatoes, apples, pears and kiwi. Also, some vegetables, such as green peppers and potatoes, may be marked using the disclosed system.

Figure 2:
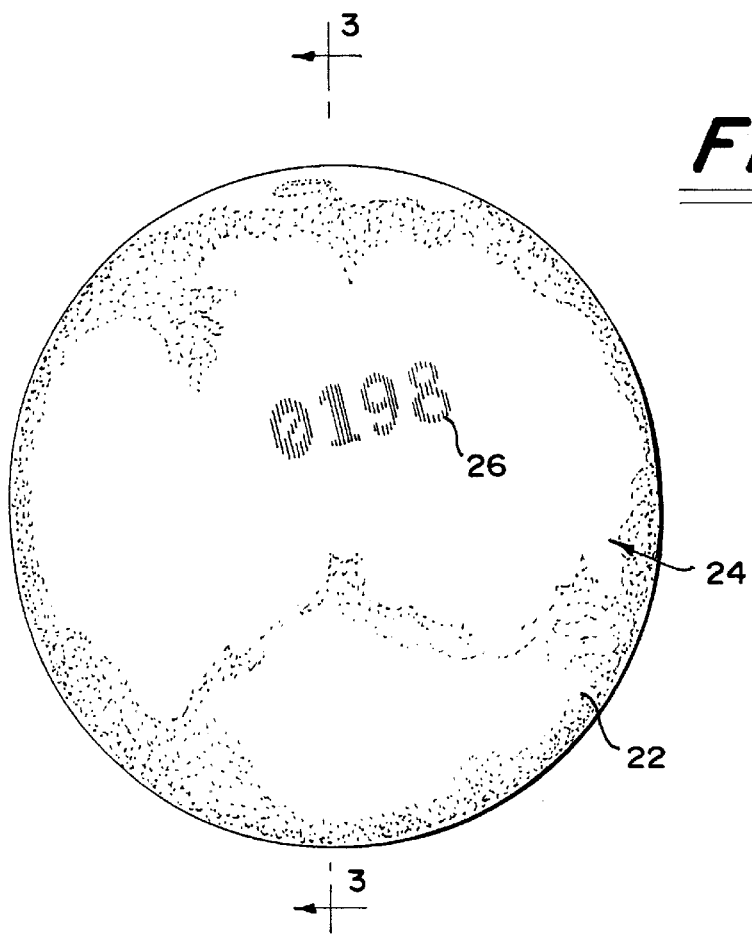
FIG. 2 is an elevational view of a piece of produce which has been marked with a different identifying mark made by one of the embodiments of the novel produce marking system disclosed herein.
Figure 11:
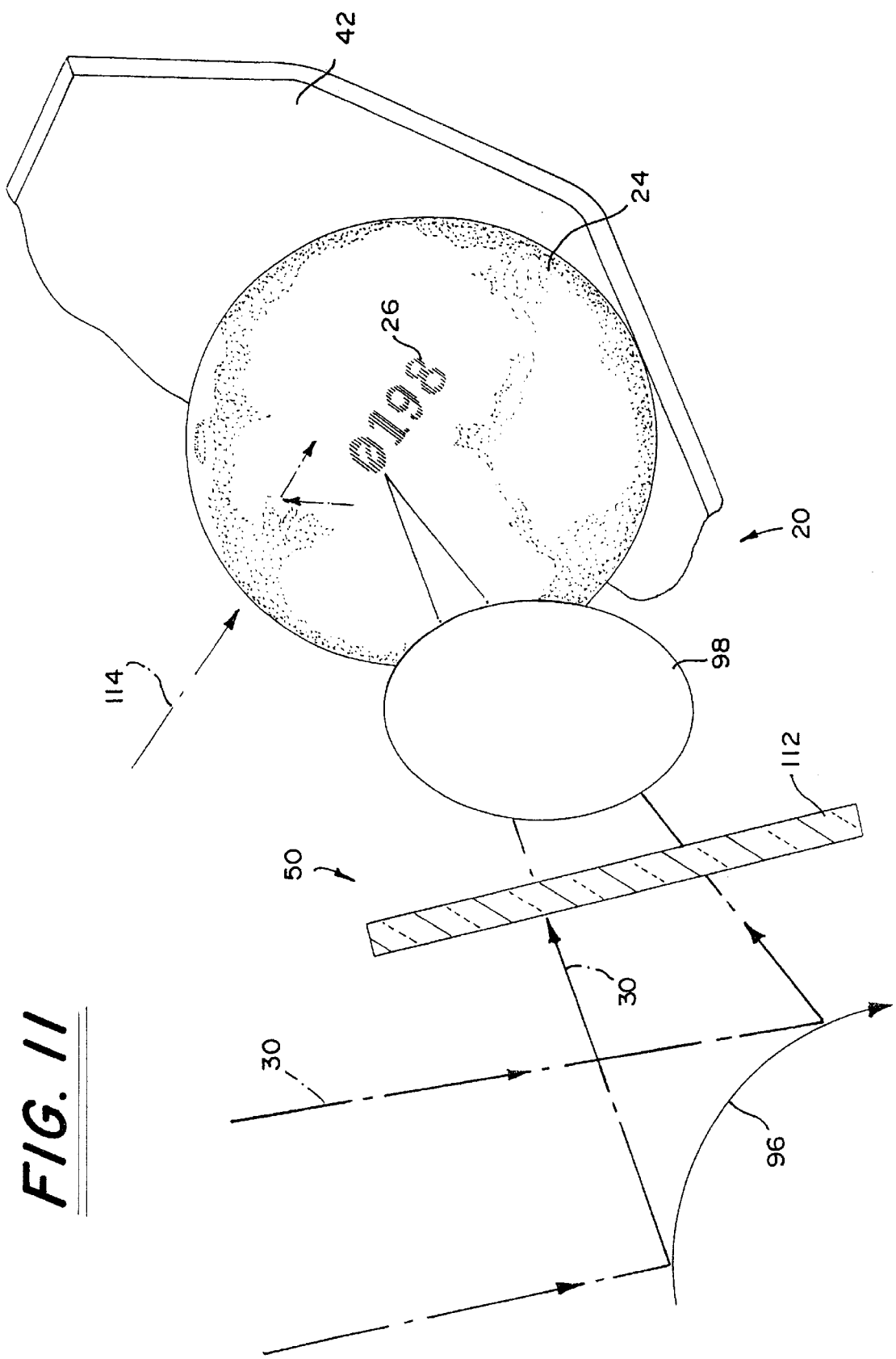
FIG. 11 is a schematic, perspective view of the components within the laser head and a perspective view of a piece of produce shown in the cup which has been broken away.

The piece of produce 24 can be marked with a variety of marks 26, such as numbers, letters or a bar code. For example, as shown in FIG. 1, an orange is marked with the word "FLORIDA" surrounded by a rectangular box. Also, for example, the produce 24 may be marked with the four digit P.L.U. number as shown in FIGS. 2 and 11 and as discussed in hereinabove, or with a brand name identification. For example, a banana bearing the marked brand name of, for example, CHIQUITA®, DEL MONTE®, DOLE® or TURBANA® bananas.

The first embodiment 20 of the produce marking system uses a laser 28 as illustrated in FIGS. 6–12. Examples of the permanent mark 26 formed on different types of produce using the laser 28 are shown in FIGS. 20–27. The laser 28 is a sterile, non-contact, high speed, efficient method of marking a piece of produce 24 and provides a sharply defined, permanent mark 26 on the skin 22 of the piece of produce 24, such as a P.L.U. identification number or other informational characters for recognition by processors, sellers and purchasers of the produce. The laser 28 uses a high intensity light beam 30 to etch the skin 22 of the produce 24 to form the mark 26. The mark 26 is produced by vaporizing a portion of the skin 22 of the produce 24 to desiccate the produce skin 22 at the point where the light beam 30 contacts the skin 22.

The skin tissue thickness varies widely between produce items with typical skin thicknesses ranging from 40 microns to 200 microns. This range of 40 to 200 microns defines one cell of the piece of produce. That is to say, if the skin thickness is equal to 40 microns of a certain type of produce, this is one cell of that piece of produce; if the skin thickness is equal to 105 microns of a certain type of produce, this is one cell of that piece of produce; and if the skin thickness is equal to 200 microns of a certain type of produce, this is one cell of that piece of produce. When marking the produce 24 with the laser system 20 of the present invention, the laser light beam 30 is precisely controlled, as described herein, to provide instant vaporization of 20 to 120 microns depth of the skin cell, i.e. approximately one-half of a cell of the skin thickness, and the depth of vaporization must not exceed one cell of the produce skin thickness. The laser light beam 30 is precisely controlled at a sufficiently high energy level to cause vaporization, yet limited in time duration to prevent transfer of heat energy to the underlying tissue of the produce 24, thereby subsequently preventing thermal degradation or breakdown of the underlying tissue. The depth of the mark formed by the laser is not to exceed one cell, however, this depth is of course dependent on the type of produce being marked by the laser and the nature and thickness of the produce skin.

Figure 3:
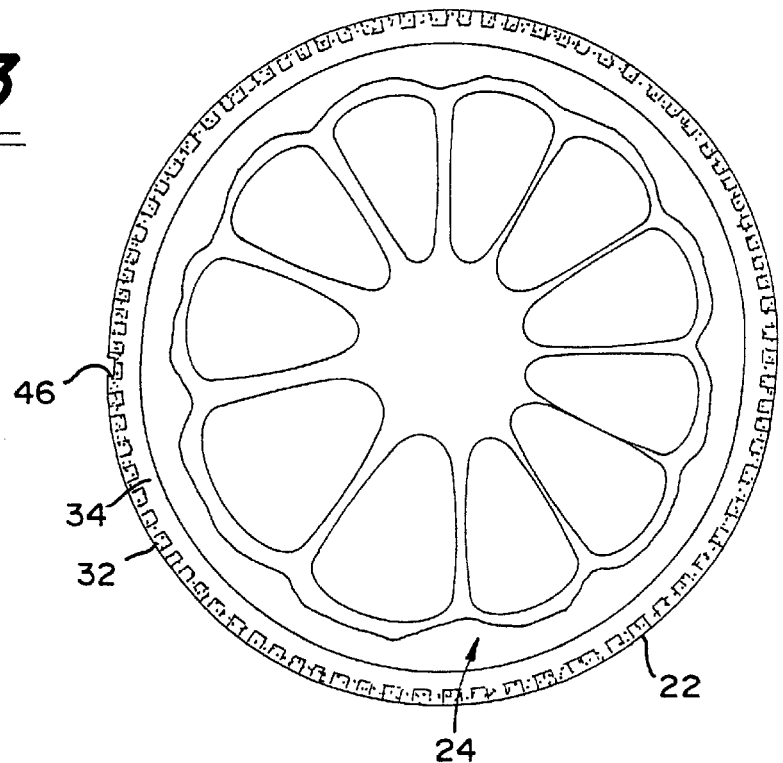
FIG. 3 is a cross-sectional view of the piece of produce, a citrus fruit in this case, along line 3—3 in FIG. 2.
Figure 4:
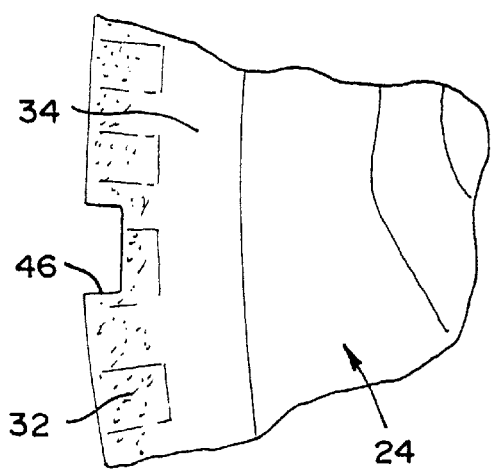
FIG. 4 is a enlarged, cross-sectional view of a portion of the citrus fruit shown in FIG. 3.

For example, the upper epidermis 32 of a citrus fruit is approximately 50–100 micrometers and the hypodermis 34 is approximately 500 micrometers, FIGS. 3 and 4. The laser light beam 30 must not penetrate below the hypodermis 34 of the citrus fruit, otherwise spoilage can occur. Preferably, the citrus fruit is laser etched to an average depth of approximately 62 micrometers. The detrimental depth to the citrus fruit is below approximately 600 micrometers.

The heat generated by the laser energy is absorbed by the surface tissue and is carried away by the vaporized tissue. The mark 26 that results is not a result of the formation of a carbonaceous residue as occurs in a branding process or in some masking procedure wherein the intensity of the laser is not controlled. Instead, the tissue is entirely removed by vaporization because of the intense energy at the target surface on the produce 24 by the laser light beam 30 thereby desiccating the produce skin 22 around the mark 26.

During the vaporization of the skin cell of the produce 24, both applied wax and natural materials such as oils in citrus are vaporized. Thus, the effects of oleocellosis (the normal mechanical rupture of these oil glands which causes a brown discolored area on the fruit surface) are not present because the laser energy vaporizes the oil in the oil glands of the produce 24. Also, it is believed that the adjacent tissue is in effect cauterized to prevent further leakage of oil. If the oil was not vaporized and the adjacent tissue not cauterized, rapid deterioration of the produce appearance could occur.

The laser 28 used in the present invention is preferably a $CO_2$ laser because of its output. The $CO_2$ laser light generating tube is a small size and is energy efficient compared to other lasers. It is contemplated that other lasers may be used, however, for example, if a YAG laser were used, it requires a light generating tube approximately ten feet long and would use large amounts of electricity.

Figure 5:
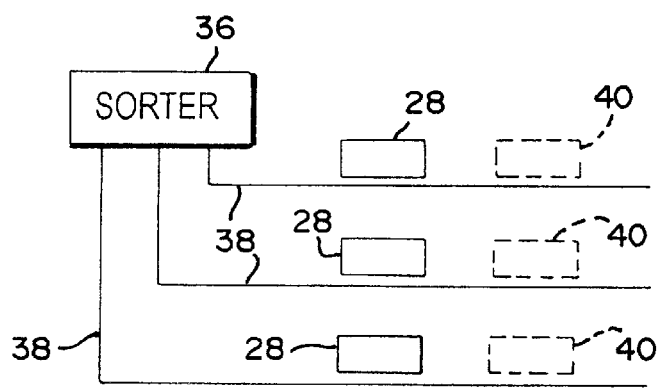
FIG. 5 is a schematic view of a produce marking system which incorporates the features of a first embodiment of the present invention wherein laser energy is used to produce the desired marking.

To mark the produce 24, as shown schematically in FIG. 5, the produce 24 is fed into a sorter 36 to separate the produce 24 into, for example, large, medium and small sizes. The produce 24 is transported to the laser 28 by a conveyor unit 38, such as a cup sizer, a sorting mechanism well known in the art. Thereafter, the produce 24 is marked by using the laser 28 to etch the desired mark 26 onto the produce 24. Next, if needed, the marked area of the produce 24 is swabbed with food dye at swabbing station 40 to enhance the mark 26 as described herein so as to provide a visually enhanced contrast between the exterior skin of the produce 24 and the mark 26. Thereafter, the marked produce 24 is collected for distribution. A laser 28 and swabbing station 40 are provided for each line of produce 24.

Produce transfer from the sorter 36 to the laser 28 can be accomplished by using a two-lane cup sizer unit manufactured by Durand-Wayland Corporation or optical-weight sizers manufactured by AgriTech of Virginia, Aweta of The Netherlands, Autoline of California, Durand-Wayland of Georgia and Sunkist Growers, Inc. Manufacturing of Ontario, Canada. It is envisioned that a direct-coupled shaft encoding could be used for keeping pace with the optical weight sizer. This arrangement is typically employed by sizer manufacturers in timing their units for camera and load cell measurements plus discharging produce via solenoid activation. Presently, a TTL-level signal is provided to the adhesive labeling units when a fruit is present for labeling.

Figure 8:
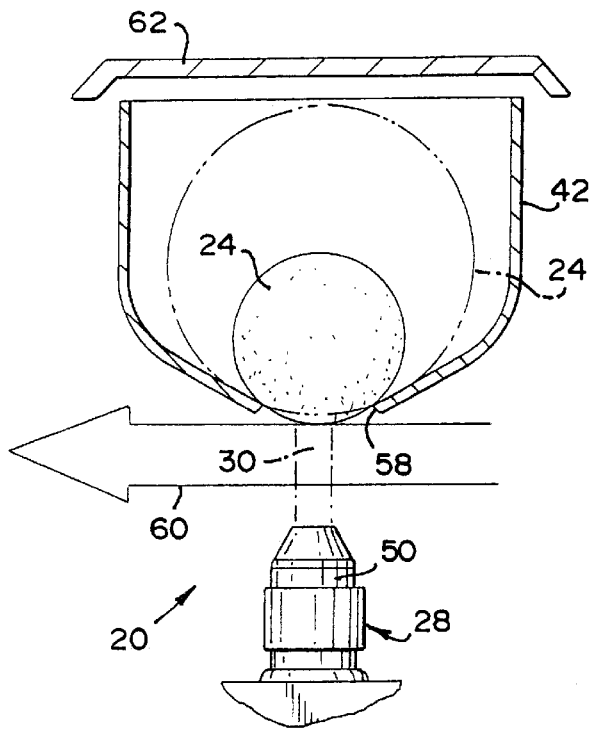
FIGS. 8, 9 and 10 are cross-sectional views of a cup holding a piece of produce therein, and side elevational views of the laser head showing the laser head in a bottom position.
Figure 9:
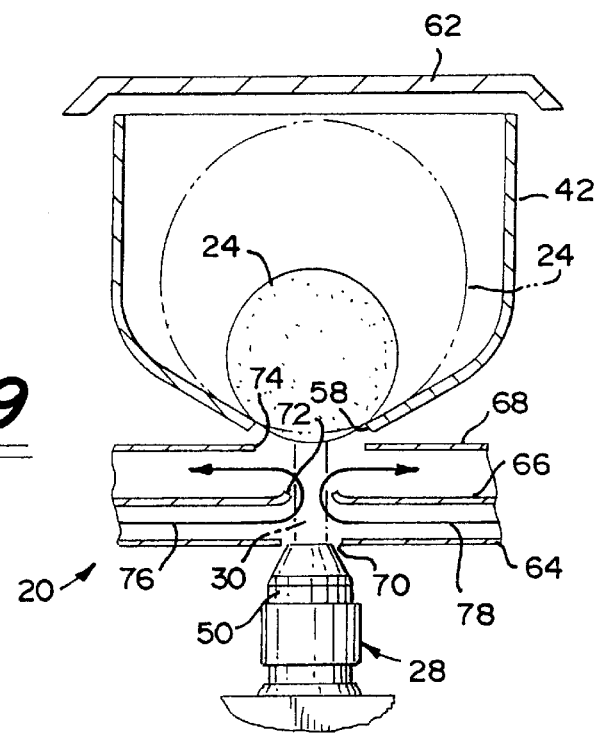
Figure 10:
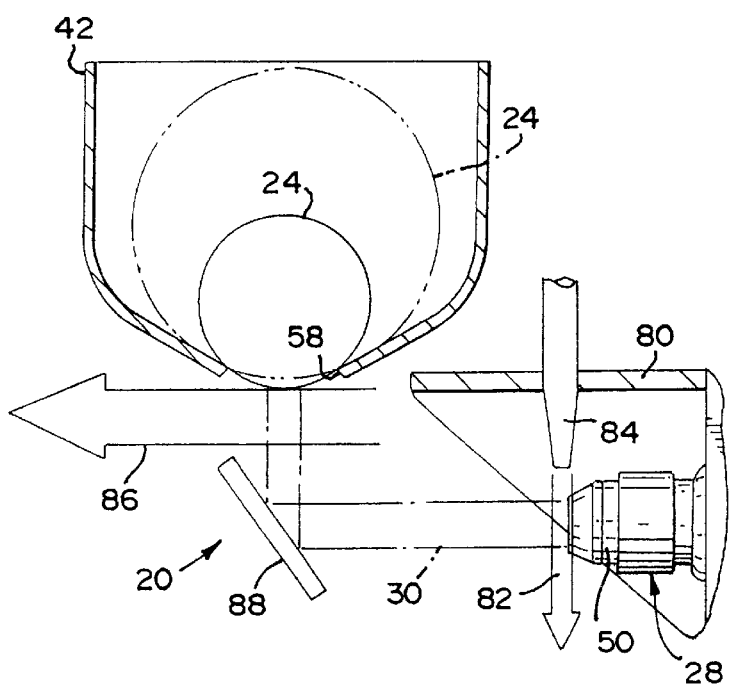

The sorter 36 has a singulator section followed by a transfer to open-topped 4.5 in. plastic cups 42, FIGS. 8–10, on 6 in. centers on the cup sizer unit 38. The cup sizer unit 38 can function in either a weight or optical dimension sizing mode. To determine the presence of a piece of produce 24, a diffuse-type photocell (ATC 7252A) can be used and interfaced to the laser 28. A variable speed motor unit is assembled to the laser 28 to generate a linear velocity signal. Typical process speed for marking the produce 24 is three to five pieces per second.

Figure 6:
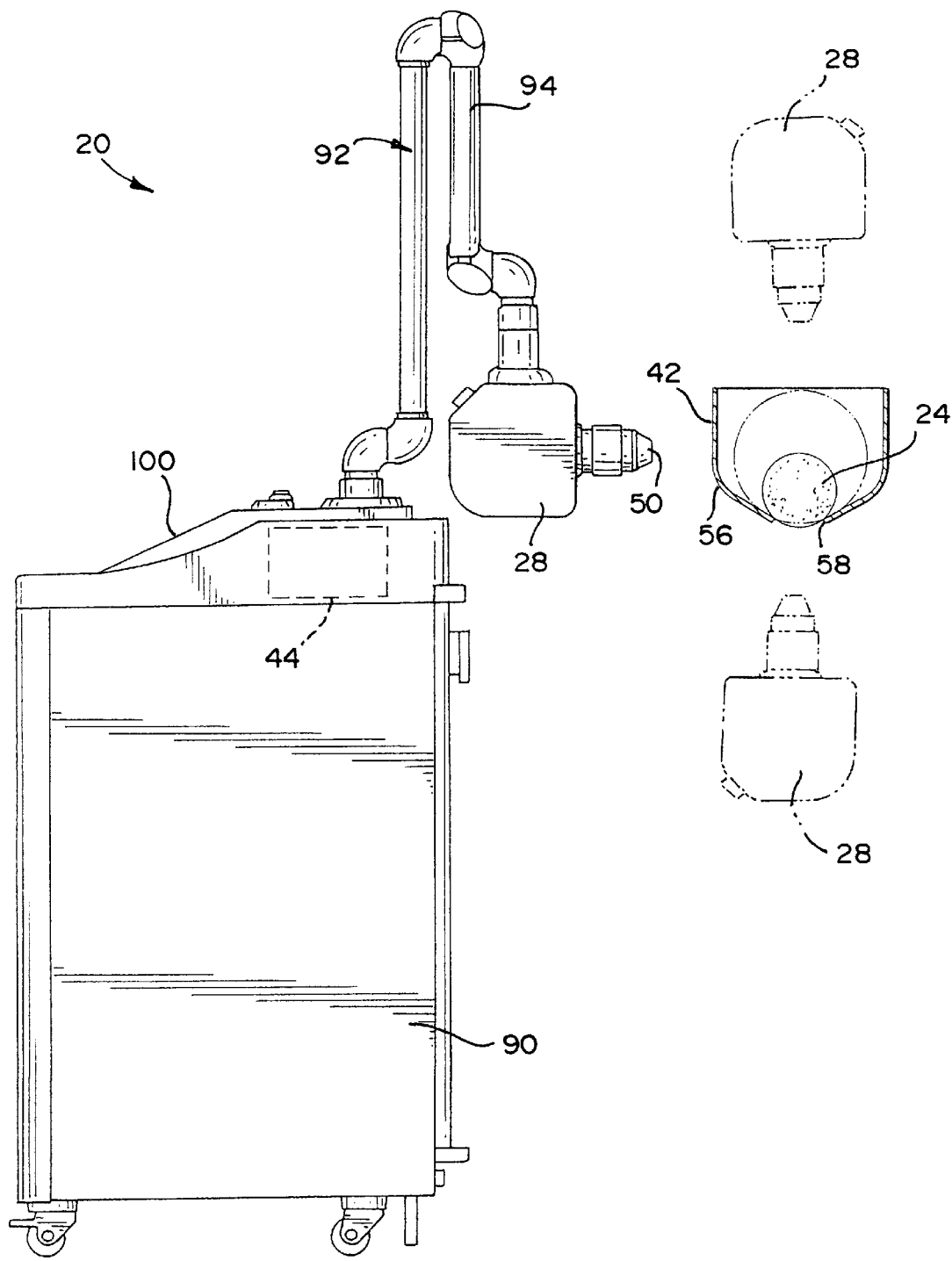
FIG. 6 is a side elevational view of a laser which may be used in accordance with the present invention, along with a cup holding the produce therein, and showing the laser head positioned in a variety of positions relative to the cup.
Figure 7:
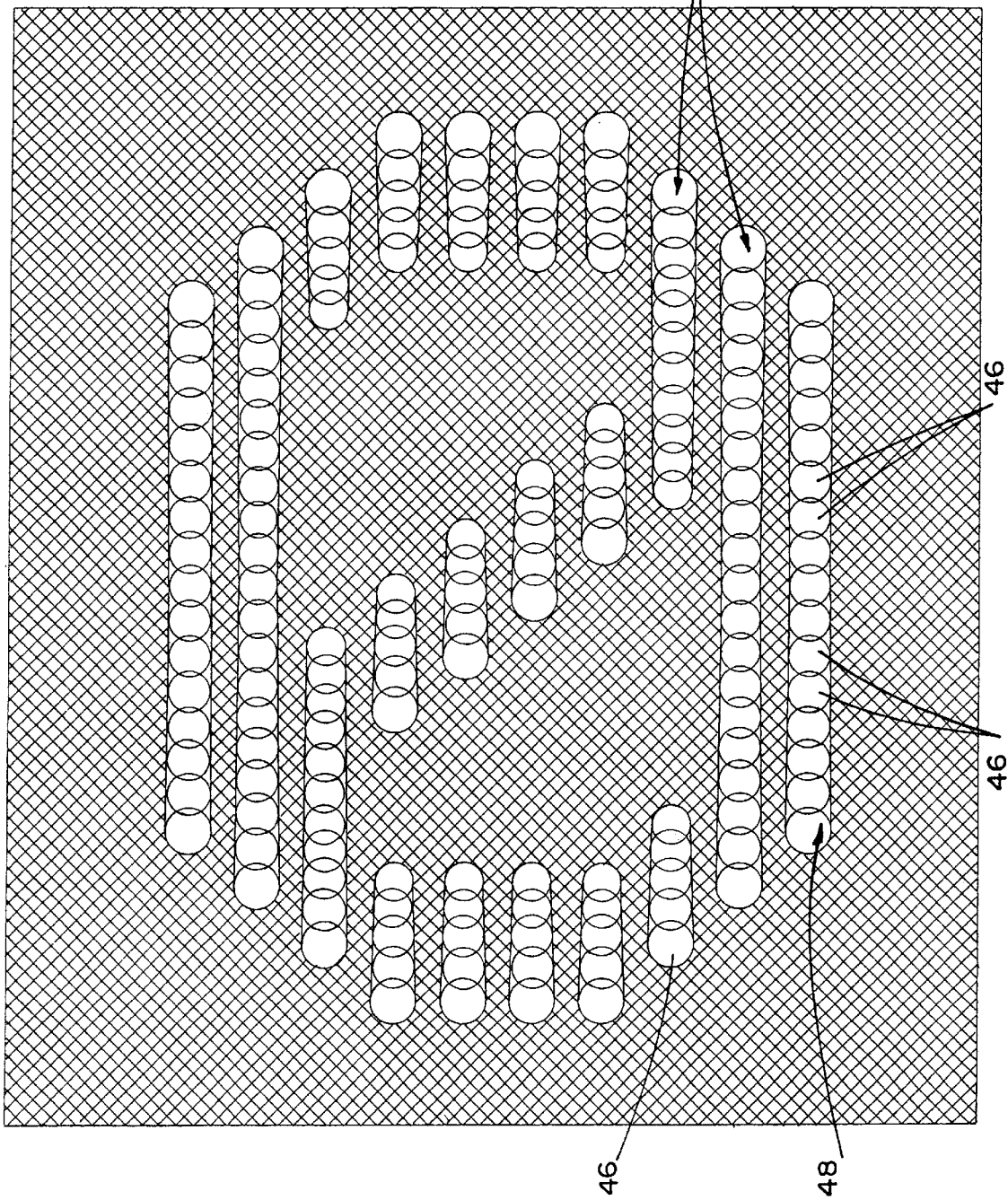
FIG. 7 is a grid showing a zero "0" number thereon which is produced in accordance with the present invention.

The laser 28 used in the present invention is connected to and controlled by a suitable computer 44, see FIG. 6. The computer 44 is appropriately pre-programmed to send the correct signals to the laser 28 depending on the size and type of the produce 24 being marked. A wide variety of marks 26 can be created with ease by programming the computer 44 accordingly. The laser treatment is limited to the desired area by means of control or steering of the laser light beam 30. The mark 26 on the produce 24 is achieved by scanning a focused-down pulsed beam of invisible infrared light 30 over the surface of the produce 24 to produce a dot matrix pattern as shown in FIG. 7. Therefore, scanning masks are not employed in the present invention as are used in the prior art.

The characters are formed by scanning modulated and focused laser light vertically over the produce 24. The combination of laser modulation and scanning is used to etch columns of individual dots 46 on the produce 24 as shown in FIG. 7 which shows how a zero mark is formed. The dots 46 are shown on a grid to clearly illustrate how the dots 46 are placed. Motion of the produce 24 is perpendicular to the remote scanning head. To mark the produce 24 properly, it is necessary to employ relative movement between the piece of produce 24 and the laser head 50. As the produce 24 moves down the line, the laser head 50 moves relative to the produce 24, by suitable means, to etch the mark 26.

The resulting mark 26 is an arrangement of lines 48, each in turn formed by a series of overlapping dots 46. Each dot 46 represents one laser burst. The degree of overlap is a function of scan rate and the laser's frequency. The amount of energy delivered is a function of scan rate, with energy delivered increasing as scan rate decreases.

The intensity of the laser 28 is controlled to control the depth of each dot 46. Each dot 46 is laser etched so as to not exceed a maximum predetermined depth of a single skin cell of the produce 24. That is, as the skin cell thickness varies widely between produce items with typical skin cell thicknesses ranging from 40 to 200 microns, when marking the produce 24 with the laser 28, the laser light beam 30 is precisely controlled to provide instant vaporization of 20 to 120 microns depth of the cell, i.e. approximately one-half of one cell of the produce skin thickness, at a sufficiently high energy level to cause surface vaporization, yet limited in time duration to prevent transfer of heat energy to the underlying tissue of the produce 24, subsequently preventing thermal degradation or breakdown of this underlying tissue.

When using the laser 28, the depth of the mark 26 can be adjusted to any desired depth. Thus, the meat of the piece of produce 24, i.e. the portion of the produce 24 underneath the skin cell, need never be subjected to the laser light beam 30. Furthermore, when it is desired to use the laser 28 to etch the skin 22 of the produce 24, the heat generated by the laser light beam 30 cauterizes the affected area around the mark 26 and thus, decay, disease and fungus are not invited since the meat of the produce 24 is not exposed to oxygen.

In general, Applicant found that during testing, the laser marking produced an off-white to light tan residual marking on the produce 24 as a result of the desiccation caused by the laser light beam 30 upon its contact with the produce 24. This mark 26 was very discernable on some fresh produce but difficult to visually detect on other produce. Easily marked produce includes: red apple, green pepper, nectarine, peach, plum and tomato. Applicant has found that during testing all of the easily marked produce were marked at greater than 80% legibility. The most difficult produce to mark were potatoes, grapefruit and oranges. It should noted that the wax treatments may be different for different produce. A mineral or vegetable oil based wax, at very low application rates, is used for green pepper and tomato. For apple, normally a shellac or carnuba-based wax is utilized. Citrus waxes are either shellac or carnuba-based, but synthetic materials, such as polyethylene-based materials, may also be utilized. Onion and potato are not waxed. It appears that the wax coating is vaporized by the laser energy along with the vaporized tissue.

For produce 24 where a high color contrast between the mark 26 and the exterior surface of the produce 24 is not achieved after the laser marking, the produce 24, for example citrus fruits, may be swabbed to enhance the mark 26 so as to provide a visually enhanced contrast between the exterior skin of the produce 24 and the mark 26. The swabbing involves using food grade coloring to enhance the etched laser mark 26 on the produce 24. The food grade coloring is nontoxic and is used widely for coloring of foods. After the produce 24, for example a citrus fruit, is laser etched with a P.L.U. number, the marked produce 24 passes under a sponge that has been soaked with a food coloring, such as FD&C Red #40, FD&C Red #1 or FD&C Blue #1, to swab the surface of the produce 24 around the mark 26. The food color is quickly absorbed into the produce tissue proximate the laser mark 26 and enhances the color contrast noticeably between the exterior skin of the produce 24 and the mark 26. The swabbing can be performed on individual pieces of produce or can be implemented on-line after the mark 26 is formed, FIG. 5. To further protect against any spoilage of the produce 24, the food grade coloring can have TBZ fungicide added therein.

When a new batch of produce 24 is ready to be marked, to alter the type of mark 26, the operator only needs to punch in the correct commands to tell the computer 44 to alter the mark 26 being made by the laser 28. If new marks or codes are to be placed on the produce 24, the computer 44 only needs to be appropriately programmed to generate the new marks. Thus, the laser 28 has a great deal of flexibility. The computer and laser 28 can be combined with a weight scale (not shown) to further help an operator classify the type of produce 24 to be marked, and change the P.L.U. number on the fly.

As shown in FIG. 6, the laser beam 30 can be directed at the produce 24 from the side of the cup 42, from the top of the cup 42 or from the bottom of the cup 42. If the laser beam 30 is directed toward the side of the cup 42, the cup 42 is provided with an aperture 56 along its side so that the laser beam 30 can impact the produce 24. If the laser beam 30 is directed toward the top of the cup 42, because the cup 42 has an open top, the laser beam 30 can impact the produce 24. If the laser beam 30 is directed from the bottom of the cup 42, the cup 42 is provided with an aperture 58 along its bottom so that the laser beam 30 can impact the produce 24. In each of these positions, a compressed air flow is provided across the end of the laser 28 to blow away any vaporized material from the front thereof to substantially prevent the vaporized materials from settling thereon. Such an air flow may be provided by a fan.

During testing for citrus fruits, the citrus fruit was fungicide treated, such as with, for example, 1000 ppm TBZ non-recovery spray, and waxed, such as with, for example, FMC 590HS water wax. After these treatments, the citrus fruit was transferred to the cup sizer unit 38 and the marking was performed. During testing for other produce items, the fruits/vegetables were also marked with the laser system. Citrus varieties tested included: Temple orange, Valencia orange, Honey tangerine, and Ruby red grapefruit. Other fresh produce tested included: red delicious apple, Granny Smith apple, peaches, green bell peppers, tomatoes, plums, onions, Idaho potatoes, golden delicious apples and nectarines. During testing it was found that the variation in product size created some difficulty in marking produce with a large size range, especially grapefruit with a packable size range from 3.31 to 5.56 inch equatorial diameter. Focal length compensation of the laser 28 was sufficient for most produce items but marginal for grapefruit when the laser 28 was directed from the top or side of the grapefruit. In all produce, some letter size variation was noted due to the irregular or rounded shapes which resulted in changes in the laser 28 to produce 24 distance.

As shown in FIGS. 8–10, the laser to produce distance variation can be overcome by laser marking from the underside of the cup 42. One size of a piece of produce 24 is shown in full lines and another size of a piece of produce 24 is shown in phantom lines. Alternatively, a feed-forward signal can be used to adjust the laser lens system. Using a typical sizer drop schedule, five or six positional index steps are implemented.

Laser marking from the underside of the produce 24 having a large range of equatorial diameters, substantially eliminates the inaccuracies in the etched mark 26. By directing the laser light beam from underneath the produce 24, the distance from the laser 28 to the produce 24 is always the same because the produce 24 generally sits in the bottom of the cup 24.

With the laser 28 facing up toward the produce 24, particulates from the vaporization of the skin tissue could collect on the laser 28 which can disrupt the mark formed on the produce 24 or overheat if impacted by the laser beam 30. As shown in FIG. 8, an air jet or vacuum is used to create an air curtain or a jet of air indicated by arrow 60 at the front of the laser head 50 to prevent particulates from falling on the laser head 50. A protective shield 62 can be used to prevent the laser 28 from firing if it is not positioned over the cup 42 as described herein.

As shown in FIG. 9, the laser head 50 faces up toward the produce 24. In this embodiment, three plates 64, 66, 68, each having an aperture 70, 72, 74 which are aligned with each other and which are aligned with the aperture 58 in the bottom of the cup 42, are provided between the laser head 50 and the bottom of the cup 42. The laser head 50 is aligned with the apertures 70, 72, 74 in the plates 64, 66, 68 and the aperture 58 in the cup 42 so that the beam 30 can pass unobstructed to the bottom of the produce 24. A supply flow of air is provided from a suitable air source between plates 64 and 66 on both sides of the laser head 50. The air flows between plates 64 and 66, through the aperture 72 in plate 66 and is evacuated by suitable means, such as a vacuum, between plates 66 and 68 as shown by arrows 76, 78. This structure directs the air flow up and away so particulate matter is "floated" and carried away from the laser head 50. A protective shield 62 can be used to prevent the laser 28 from firing if it is not positioned over the cup 42 as described herein.

As shown in FIG. 10, the laser head 50 does not need to directly face up toward the bottom of the produce 24 in order to direct the laser light beam 30 toward the bottom of the cup 42. The laser head 50 can alternately be placed at an angle to the bottom of the produce 24 in order to minimize the possibility of particulate contamination obscuring the laser light beam 30. The laser head 50 is enclosed in a protective hood 80. An air curtain or a jet of air, denoted by arrow 82, is provided by suitable means across the front of the laser head 50 by jet 84. Another air curtain or jet of air, denoted by arrow 86, is provided by suitable means across the bottom of the cup 42. The laser light beam 30 is directed off of an angled mirror surface 88 up to the bottom of the produce 20. When this embodiment is used, the characters are projected backwards because of the mirror surface 88. These air curtains 82, 86 respectively prevent particulates from falling on the laser head 50 and on the mirrored surface 88. A protective shield, such as the protective shield 62 shown in FIGS. 8 and 9, can also be provided in this embodiment.

Other means of preventing particulates from falling on the laser head 50 are within the scope of the invention. For example, it is envisioned that a transparent shield may be scrolled across or moved across the laser head 50 to prevent particulate contact therewith.

When the mark 26 is formed from the underside of the produce 24 in FIGS. 8–10, a wide variety of produce 24 can be run down the line consecutively without significant variations in letter quality. Once the type of produce 24 is determined, whether it be a grapefruit, orange or kiwi, the computer 44 signals the laser 28 as to what mark is to be etched on the produce 24 and the desired mark 26 is formed thereon.

Additionally, regardless of from where the laser light beam 30 is directed toward the produce 24, whether it be from the side, top or bottom, the sorter 36 can be eliminated and instead, the mark 26 can be formed on the produce 24 "on the fly" such that a wide variety of produce 24 is run down the line consecutively and the laser 28 is changed to provide the desired mark 26. Sensors are used to determine the size of the produce 24 and how far the laser 28 should be from the produce 24. The sensor readings are sent to the laser computer 44 which determines what type of mark is needed. Thereafter, the laser 28 is moved to the proper distance by suitable means and the desired mark 26 is etched on the produce 24. This provides a significant advantage over the prior art scanning mask systems where the mark cannot be changed "on the fly".

It is Applicant's belief that a laser device which will perform in accordance with the disclosure herein is a standard $CO_2$ or SP/SPe laser manufactured by Lumonics Corporation under the name Lumonics Xymark™ Sprint system. This laser uses a computer to direct the laser light beam 30 along a media, in the present invention a piece of produce 24, in the desired outline to create a desired mark. This is a high speed laser dot matrix printing system, utilizing a radio frequency $CO_2$ laser operating at 10.6 micro meters in the mid-infrared region of the electromagnetic spectrum. The laser requires no consumables other than electricity, and routine maintenance. Using the standard Lumonics Xymark™ Sprint system, the produce 24 was successfully marked at a rate of three to five pieces per second.

Unlike the conventional $CO_2$ laser marking technique used widely today, the Lumonics Xymark™ Sprint system does not need a scanning mask to produce the mark 26 on the produce 24. Also, the Lumonics Xymark™ Sprint system can print on a moving object that does not have a uniform linear speed. Using this laser, there is no need for masking thereby allowing for real time on-line changes of the mark produced. The Lumonics Xymark™ Sprint system output can be adjusted infinitely within its range to provide the depth, or penetration needed to produce the mark.

FIG. 6 schematically shows the Lumonics Xymark™ Sprint system. The system includes a main cabinet 90 which has an articulated arm and conduit assembly 92 extending therefrom. A remote scanning head 50 is provided at the end of the articulated arm and conduit assembly 92. The articulated arm and conduit assembly 92 provides a flexible link for transfer of the laser beam between the main cabinet 90 and the remote scanning head 50. The flexible conduit which is routed along the articulated arm 94 carries the power, control cabling and air line for the remote scanning head 50. At the end of the articulated arm 94, a head input lens adjuster is provided which allows the user to vary the spot size of the laser beam on the produce 24. Within the remote scanning head 50 is the laser beam scanning mechanism 96, a rotating polygon as described herein with respect to FIG. 11, and a detector system which is used to synchronize the signals for feedback to the control electronics of the laser output and speed of printing. An adjustable output lens system 98 is provided on the end of the remote scanning head 50 which allows the user to vary the printed character height on the produce 24. The computer 44 is provided within the main cabinet 90 and a display and keypad 100 for inputting desired data into the computer 44 are provided on the main cabinet 90.

Figure 12:
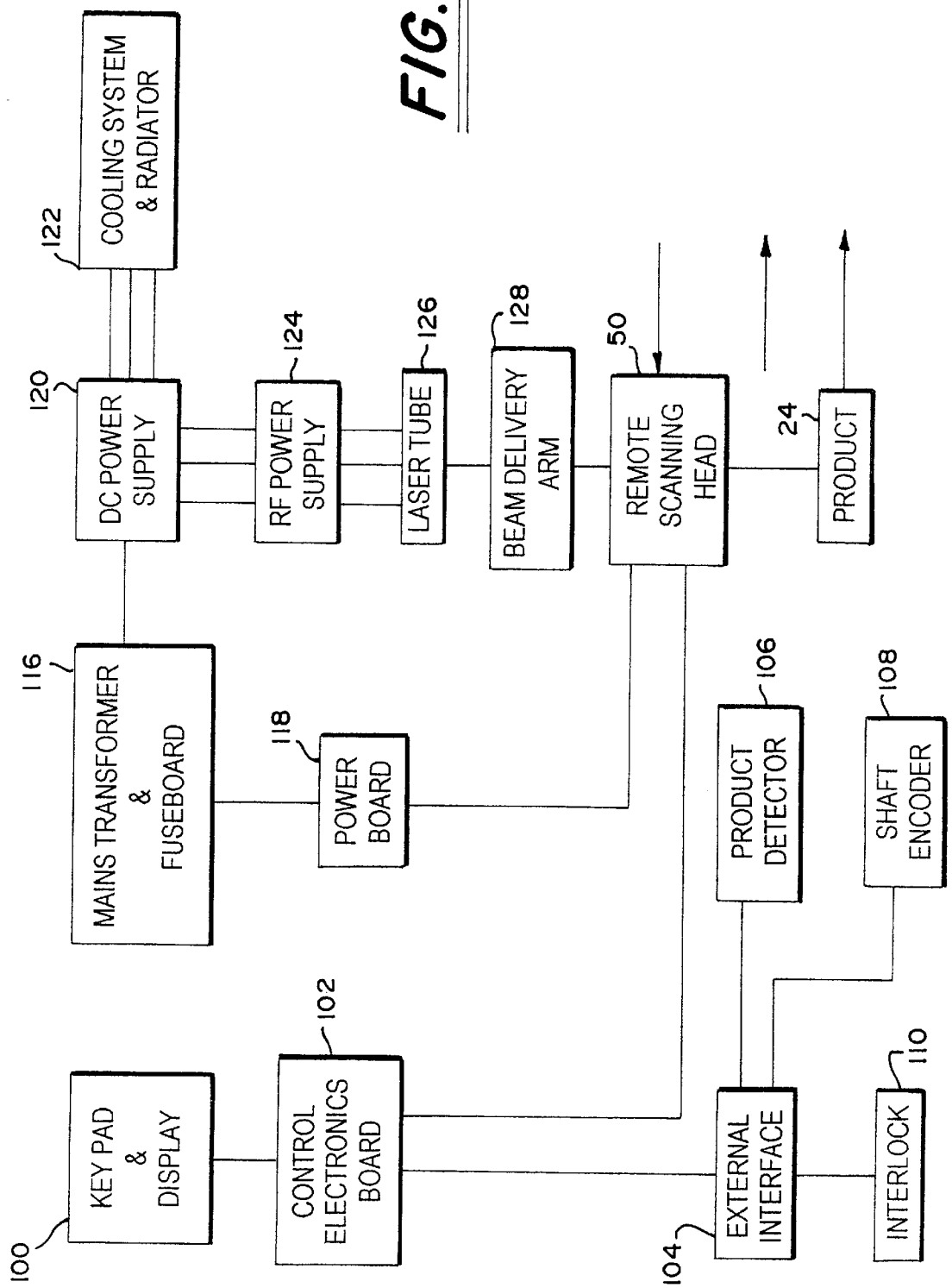
FIG. 12 is a flowchart of a laser system which may be used in the present invention.

FIG. 12, shows a flow chart which discloses the operation of the Lumonics Xymark™ Sprint system. To start, the user inputs the desired code and system parameters using the keypad and display 100 on the main cabinet 90. The control electronics board (CEB) 104 is the main central processing unit (CPU) of the laser. The CEB 104 monitors and processes all inputs and outputs of the laser and its components. With the user's input of the desired code to be printed and laser parameters that are the fundamental system settings that enable the system to print, the CEB 104 uses this input and the input from the attached external sensors to make the necessary calculations and adjustments for the laser to operate properly.

The CEB 104 has two major inputs. One of these inputs is an external interface 104 which is a point of connection for external devices which can be a variety of different sensors. In this application, three sensors are connected to the external interface 104: a product sensor 106, a shaft encoder 108 and a safety interlock 110.

The product sensor 106 determines if there is product present to mark. A send and receive infrared beam switch can be used for the product sensor 106.

The shaft encoder 108 is a sensor that is mounted on the production line on which the produce 24 is being conveyed. The shaft encoder 108 records the line speed and outputs a signal that is used by the CEB 104 for timing purposes.

The safety interlock 110 is a safety device that ensures that if the laser beam 30 were reflected off some outside object on a line, the laser beam 30 would not harm anyone. The safety interlock 110 is a micro-switch which is mounted on a protective shield 62 over the remote scanning head 50 and the produce 24. If the protective shield 62 is removed or lifted, the micro-switch is opened, which, in turn, shuts down the laser 28.

The second input to the CEB 104 is from the remote scanning head 50. Within the remote scanning head 50 is the rotating polygon 96 and the detector system which is used to synchronize the signals derived from the rotating polygon 96 for feedback to the CEB 104. Also inside the remote scanning head 50 is a galvo mirror 112. The galvo mirror 112 tracks the produce 24 as it moves past the remote scanning head 50. The rotating polygon 96 controls the laser beam 30 vertically, starting at the bottom of a column and moving up to the top of that column. After the laser beam 30 is reflected off the rotating polygon 96, the laser beam 30 hits the galvo mirror 112. The galvo mirror 112 directs the laser beam 30 horizontally across the produce 24 as the produce 24 moves across the remote scanning head 50 as shown by arrow 114. For example, the rotating polygon 96 is only able to direct the laser beam 30 up and down or in the y-axis plane, and the galvo mirror 112 can only direct the laser beam 30 in the x-axis plane. With this combination of x-axis and y-axis movement, the laser beam 30 prints any desired mark 26. The produce 24 cannot move away from the remote scanning head 50, but perpendicular to the head 50. The CEB 104 controls the timing of the movement of the produce 24 and the remote scanning head 50.

The closer the rotating polygon 96 to the galvo mirror 112, the smaller and more focused the beam 30 is on the produce 24. Preferably, the remote scanning head 50 of the laser 28 is up to two and quarter inches (2¼") away from the produce 24, but could be plus or minus approximately one-half of an inch (±~½") from that distance. This range depends on what surface is being etched and the produce 24 variation. If the produce 24 varies more than 6 mm in distance to or from the output lens system 98, printing distortions sometimes appear as short fat marks or tall skinny marks.

On the power delivery side, a mains transformer and fuseboard 116, which is formed from a plug from the power source to the laser 28, is provided. The mains transformer and fuseboard 116 supplies all the power requirements for the laser 28. Attached to the mains transformer and fuseboard 116 is a power board 118 which supplies the proper current to the remote scanning head 50.

A DC power supply 120 is also connected to the mains transformer and fuseboard 116 to supply power for a cooling system and radiator 122 and an RF power supply 124. The cooling system and radiator 122 are formed from a fan blown radiator, a pump, a coolant top-up reservoir, and a flow switch that monitors the coolant flow.

A laser tube 126, which is what produces the laser beam 30, is connected to the RF power supply 124. The RF power supply 124 supplies the laser tube 126 with the needed power requirements. The cooling system and radiator 122 is used to water cool the laser tube 126.

After the laser tube 126 fires a beam of light 30, the light beam 30 is transmitted down the articulated arm 94 to the remote scanning head 50. When the light beam 30 reaches the remote scanning head 50, the light beam 30 is focused onto the surface of the rotating polygon 96. The polygon 96 scans the beam 30 onto the galvo mirror 112, which transmits the scanned beam 30 onto the produce 24.

The characters are formed by scanning modulated and focused laser light vertically over the moving produce 24. The Lumonics Xymark™ Sprint system is capable of writing in a variety of mixed dot matrix formats, 5×5, 5×7, and 10×16 mm, and at a rate of 1950 char/sec. This speed depends on the material to be marked and the mark being printed. The Lumonics Xymark™ Sprint system can code up to four lines of text or graphics. Motion of the produce 24 is perpendicular to the remote scanning head 50.

The laser energy is automatically controlled and delivered by setting the line speed sensor and the desired depth of the mark. The rate of laser advancement is controlled by the line speed sensor, so depending on the mark being produced, the rate of laser advancement varies widely. The width of the laser beam at the produce surface can be adjusted to the user's liking, within the range of 1 mm to 3 mm dot diameter.

When the laser beam contacts the skin 22 of the produce 24, the laser beam 30 vaporizes the tissue up to a depth that does not exceed one cell of the skin thickness to desiccate the produce skin 22 and form the mark 26. The duration of the laser beam pulse determines the depth of the mark. Because of the very short time the laser pulse is on, the average pulse duration is about 5 milliseconds, it does not affect the surrounding area with the intense heat. Because the produce tissue is cauterized, there is no open wounding of the produce surface, pathogens cannot gain ingress. The time duration of the laser beam pulse is controlled by a galvo sensor which receives the line speed from the shaft encoder 108. The mark 26 on the produce 24 can be set to the desired depth and size.

During testing, the depth of the laser marking averaged 65 microns+26 microns (x±standard deviation). This was determined by light microscopy inspection of thin section slices of the skin cell tissue at the marked area. It was noted that certain oil glands were ruptured at the marking but apparently the oil therein was vaporized. During testing it was found that depth at an oil gland crater was approximately 90 to 145 microns.

The laser energy available at the target surface is 2.5 joules maximum. The calculation to determine this output is watts/sq. cm. In vaporizing the skin cell of the produce 24 with this intense energy, the mark 26 is sealed from the environment.

The range of temperature varies with the size of the mark 26 and speed of the line. The typical temperature average is about 800° F. at 5 ms. The wavelength output is 50 watts/sq. cm. of laser light diameter.

This system and method of marking produce 24 with laser energy offers a technique of coding at very high line speeds. Because the laser 28 is used to form the mark 26, there is no mess or waste of adhesive labels and their paper backing. This system 20 is economical to run because there is no need for an operator to change labels, refill label spools, or clean the clogged production equipment. The mark 26 is clean, safe, edible, permanent, efficient, and environmentally friendly.

Figure 17:
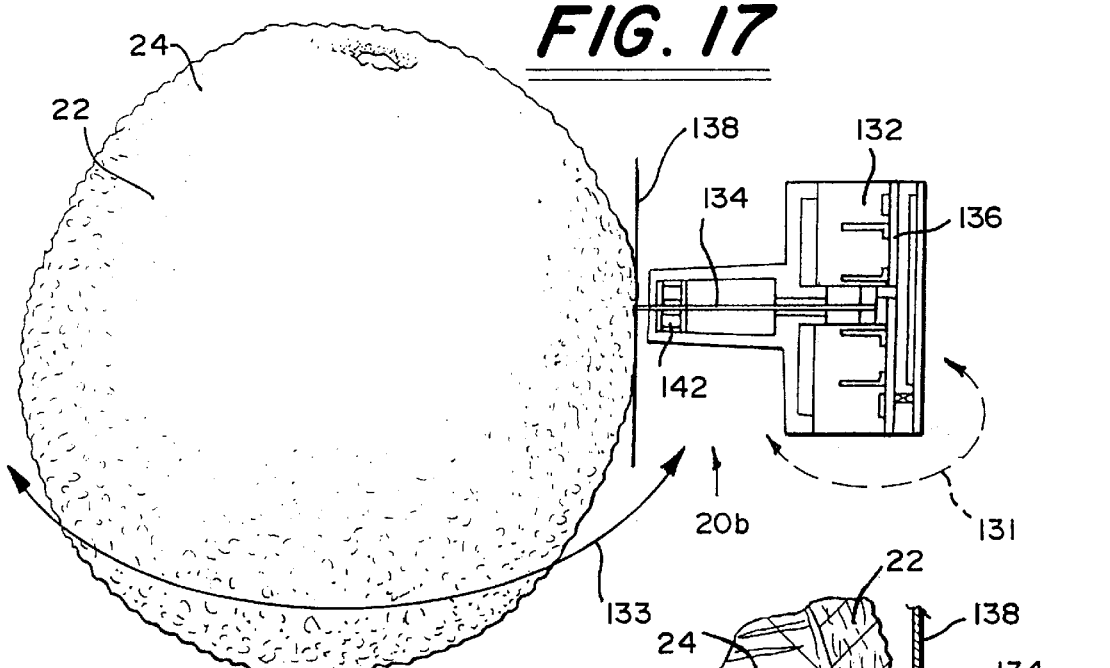
FIG. 17 is a top, schematic view of a produce marking system which incorporates the features of a third embodiment of the present invention.

The second and third novel embodiments of the produce marking system 20a and 20b, which are used to form a permanent mark 26 on the skin 22 of a piece of produce 24, are respectively illustrated schematically in FIGS. 13 and 17. In each embodiment of the system 20a and 20b, a printer head 132 similar to that as employed with a dot matrix printer will be used with the exception that an ink ribbon is not used. It should be noted that standard dot matrix printers employ an ink carrying ribbon, wherein the pins of the printer head impact upon the ribbon to transfer a "dot" of ink to the underlying medium. For use in the present invention, as the pins of the dot matrix printer move back and forth, the relative temperature of the pins become elevated due to friction, or alternately as contemplated with the present invention, the pins may be heated. A standard dot matrix type printing head has been found to work well in providing an identifying mark 26 on the skin 22 of the produce 24 in the present invention. The printer head 132 illustrated in FIG. 14 for use with the present invention is a conventional dot matrix printer head, without the ink ribbon, and may use nine (9) vertically staggered pins 134, as shown in FIG. 15, or may take the form of another conventional type of dot matrix printer such as twenty-four (24) pin dot matrix printer for a higher quality mark. While the term "pin" is used herein, a pin is also commonly referred to as a "wire" in the dot matrix printer head industry.

Since a conventional dot matrix printer is illustrated in conjunction with the disclosure of the present invention (without the ink ribbon), the structure and operation of the printer head 132 is not described in detail, as it is well known to those skilled in the art. Briefly, a dot matrix printer is controlled by a computer (not shown). The dot matrix printer head 132 has spring biased pins 134 which are held in a retracted position by a solenoid 136 controlled by the computer. To activate the pins 134 to fire out of or extend from the printer head 132 and impact a media, the solenoid 136 is de-energized. Since the pins 134 are spring biased, without the pull of the solenoid 136, the pins 134 fire out of the printer head 132. In FIG. 15, the pins 134 are shown in a retracted position in solid lines and in an extended position in phantom lines.

The pins 134 of the dot matrix printer head 132 are hot due to friction and the heat generated by the solenoid 136. Thus, when the pins 134 contact the media, a dot for each pin will be created on the media. After the pin 134 impacts the media, the solenoid 136 is reactivated by a signal from the computer which pulls the pin 134 back to its retracted position.

Figure 16:
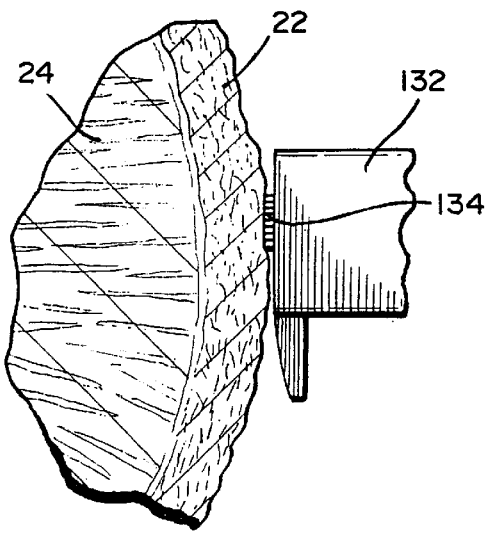
FIG. 16 is a partial, schematic view of the pins of the dot matrix printer head impacting the skin of a piece of produce, with the produce shown in cross-section and partially broken away, in accordance with the second embodiment of the present invention.
Figure 18:
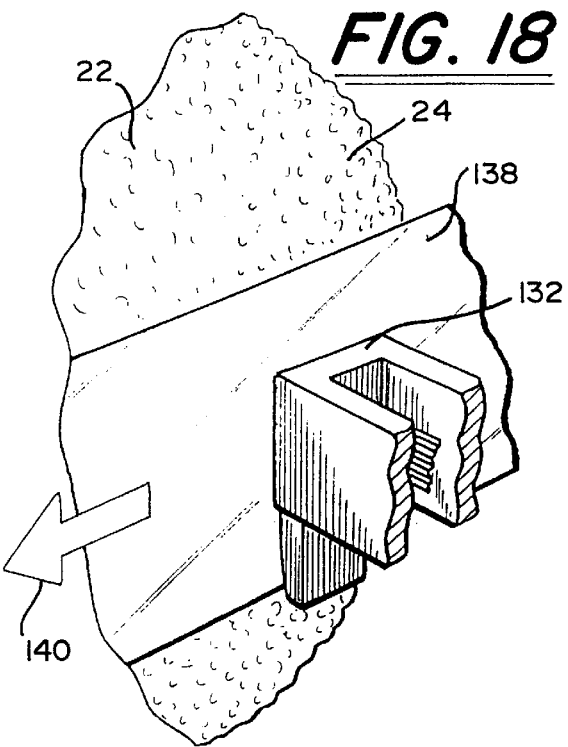
FIG. 18 is a partial, perspective view of the dot matrix printer head impacting the ribbon in accordance with the third embodiment of the present invention shown in FIG. 17.
Figure 19:
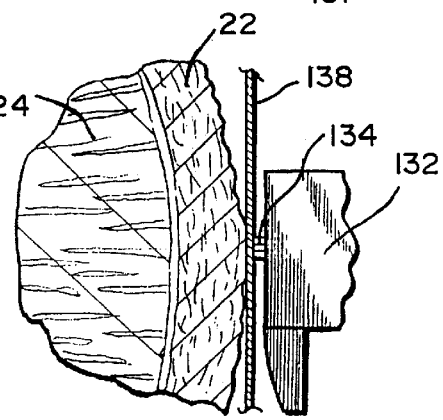
FIG. 19 is a partial, schematic view of the pins of the dot matrix printer head impacting a thermally conductive ribbon which abuts the produce, which is shown in cross-section and partially broken away, in accordance with the third embodiment of the present invention shown in FIGS. 17 and 18.
Figure 20:
FIGS. 20–27 are color drawings showing various produce marked in accordance with the techniques described herein.
Figure 21:
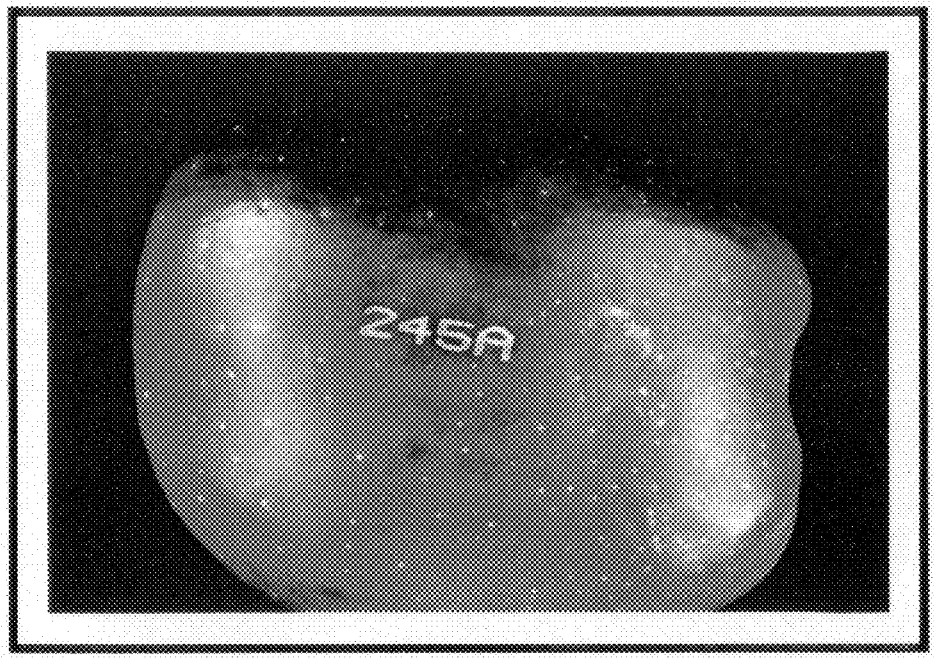
Figure 22:
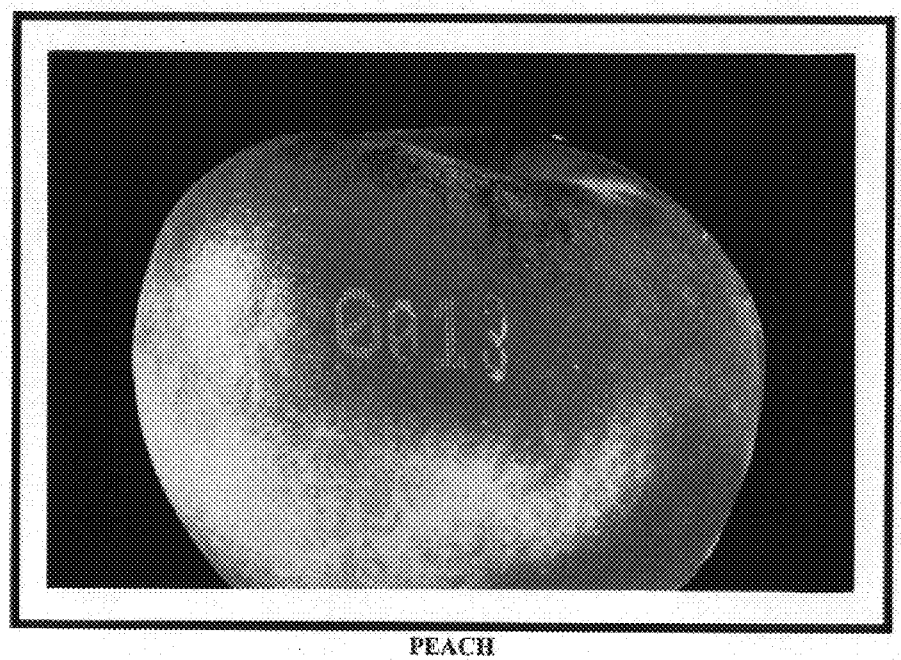
Figure 23:
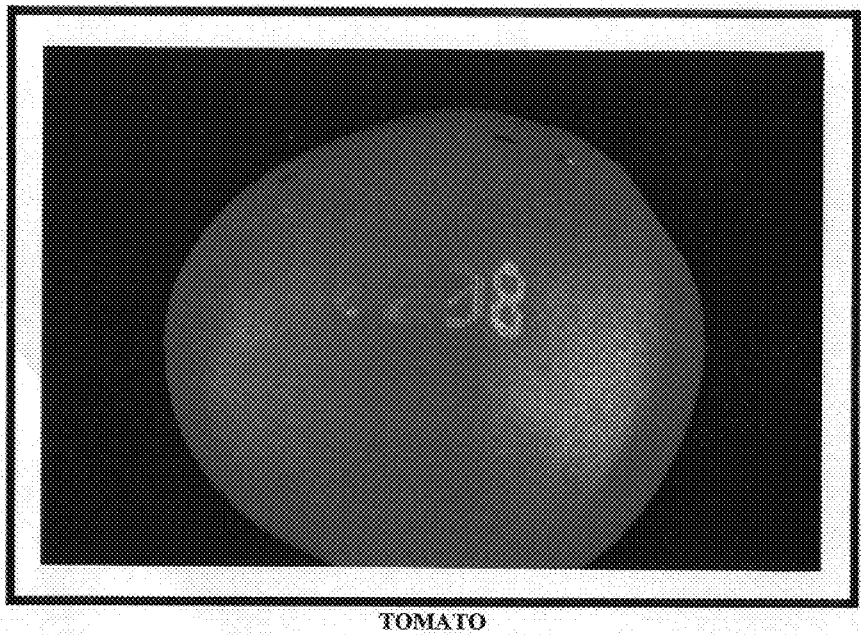
Figure 24:
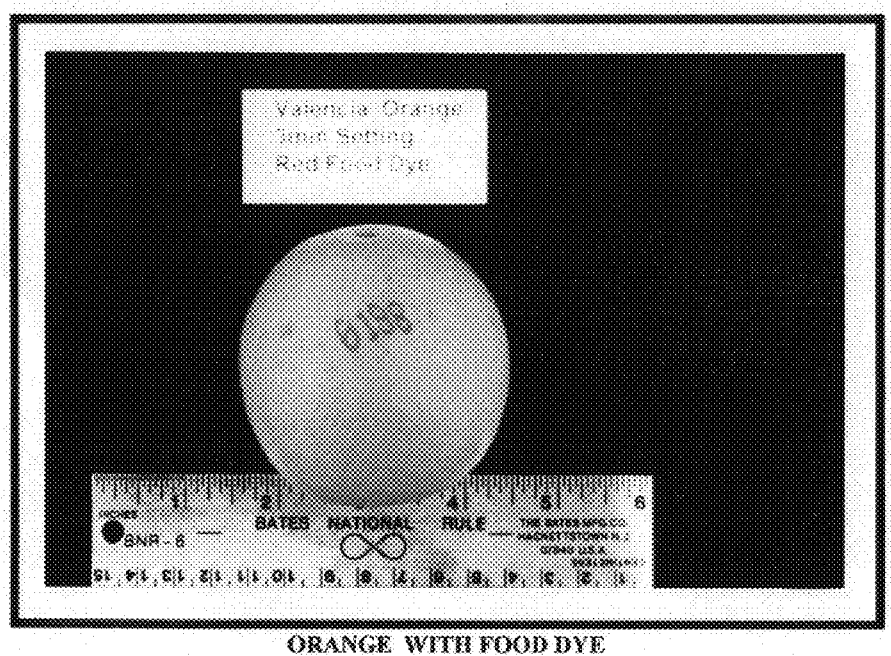
Figure 25:
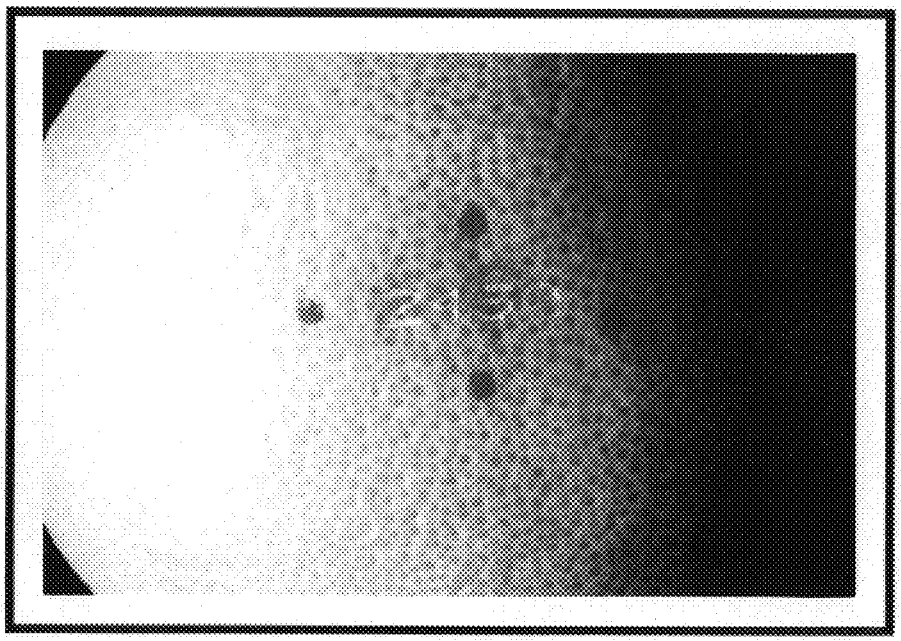
Figure 26:
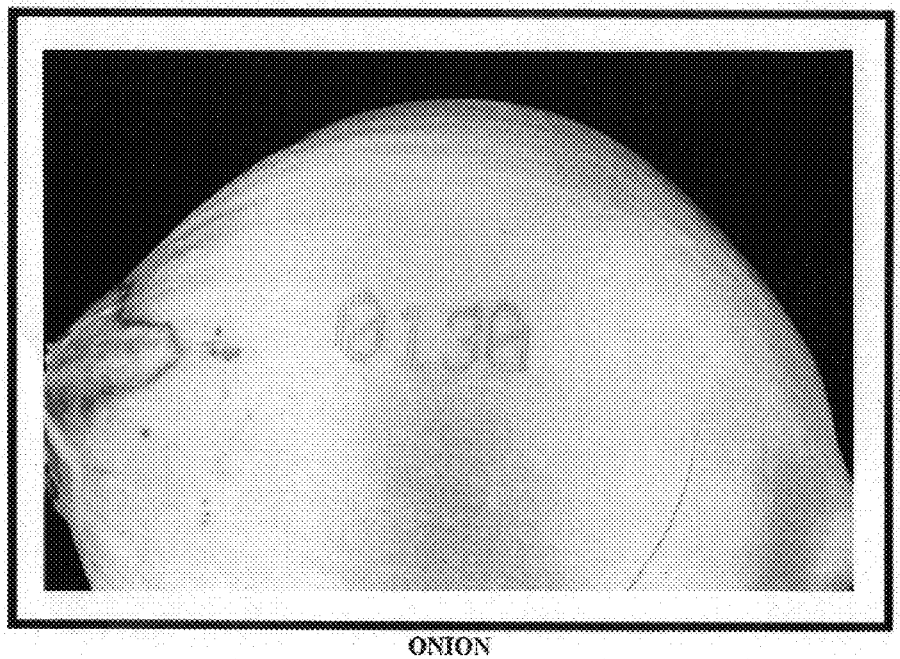
Figure 27:
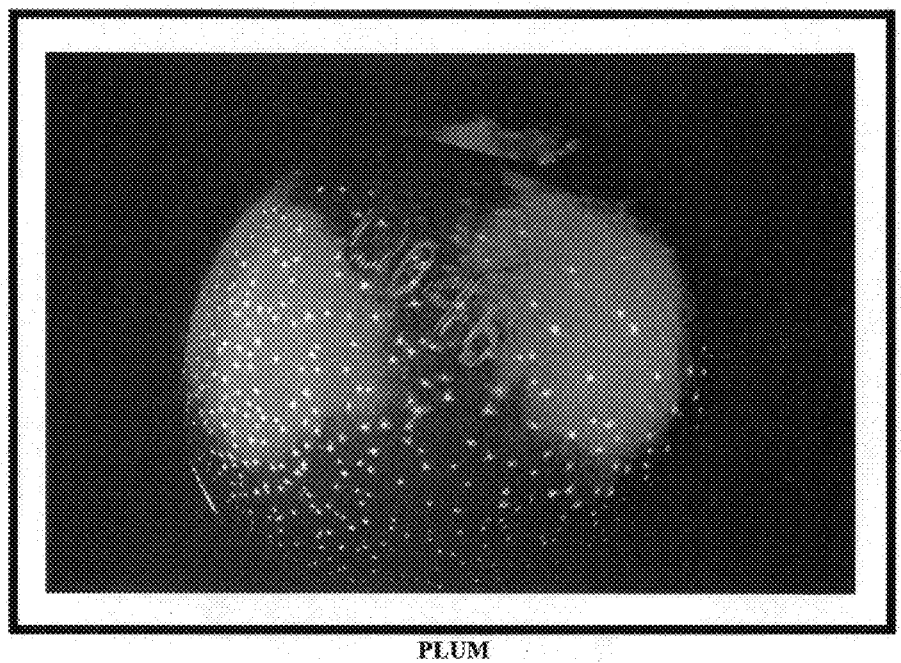

In the second embodiment 20a of the novel produce marking system disclosed herein, and as illustrated in FIGS. 13 and 16, the media which the pins 134 of the dot matrix printer head 132 contact when the pins 134 are fired is the skin 22 of the produce 24 itself. In the third embodiment 20b of the novel produce marking system disclosed herein, and as illustrated in FIGS. 17, 18 and 19, the media which the pins 134 of the dot matrix printer head 132 contact when the pins 134 are fired is a ribbon 138 which generally abuts the skin 22 of the piece of produce 24 and is disposed between the skin 22 and the printing head 132.

In the second 20a and third 20b embodiments of the produce marking system, relative rotation between the piece of produce 24 and the dot matrix printer head 32 is employed as indicated by arrows 131 and 133, FIGS. 13 and 17. Also, in the third embodiment 20b, the ribbon 138 moves horizontally as shown by the arrow 140 during the relative rotation between the piece of produce 24 and the dot matrix printer head 132. Thus, to print a line of characters, either the dot matrix printer head 132 moves horizontally, as shown by, for example, the dotted arrow in FIGS. 13 and 17, along a track (not shown) across the piece of produce 24 with each pin 134 firing as necessary to etch the appropriate mark on the skin 22 of the piece of produce 24 or, the dot matrix printer head 132 remains stationary and the piece of produce 24 rotates, as shown by, for example, the solid arrow in FIGS. 13 and 17, along a track (not shown).

In the second embodiment 20a of the produce marking system, illustrated in FIGS. 13 and 16, the pins 134 of the dot matrix printer head 132 directly contact the skin 22 of the piece of produce 24. As shown in FIG. 16, the pins 134 of the dot matrix printer head 132 do not penetrate or cut into the skin 22 of the produce 24; the pins 134 press up against the skin 22 of the produce 24, which may cause a slight indentation, to etch the mark onto the skin 22 of the produce 24. It is envisioned, however, that there may be some penetration of the skin 22 of the produce 24 by the pins 134 of the dot matrix printer head 132. The depth of the mark 26 on the skin 22 of the produce 24 depends on how long the pins 134 contact the skin 22.

Heat is generated by friction and/or by convection from the solenoid 136, which acts as a heat sink, which heat tends to cauterize the skin 22 of the produce 24 around the etched area. Thus, decay, disease and fungus are not invited since the meat of the produce 24 is not exposed to oxygen.

Suitable heating elements 142 may be included within the dot matrix printer head 132 near the end of the pins 134 which contact the produce 24. The heating elements 142 assure that a sufficient amount of heat is generated even during startup. A thermostat (not shown) may be included in the printer head 132 to prevent overheating.

The dot matrix printer may include a cleaning station at the end of the line to remove any gum substance which may accumulate on the pins 134 due to direct contact with the skin 22 of the produce 24. Cleaning stations for use in dot matrix printers are well-known in the art and as such are not described herein.

In the third embodiment 20b of the produce marking system, shown in FIGS. 17, 18 and 19, the pins 134 of the dot matrix printer head 132 which are at an elevated temperature contact the strip of thermally conductive ribbon 138 which generally abuts the skin 22 of the produce 24. The ribbon 138 is an electrically and thermally conductive foil or ribbon, but it is envisioned that other types of ink free ribbons, such as paper, may be used. The pins 134 contact the ribbon 138, and since the pins 134 are at an elevated temperature, a hot spot is created on the ribbon 138 which in turn etches the skin 22 of the produce 24 to form a dot which is used to produce the desired marking. As noted above, the printer head 132 for embodiment 20b may include heating elements 142 to assure that a sufficient amount of heat is generated even during startup. The depth of the mark 26 on the skin 22 of the produce 24 depends on how long the pins 134 contact the ribbon 38.

The ribbon 138 protects the pins 134 and printer head 132 from vapors which are generated during the etching process of the produce skin. This minimizes the amount of residue which may accumulate on the pins 134 of the printer head 132, and will avoid excessive cleaning.

In the second and third embodiments of the produce marking system 20a, 20b, like that of the first embodiment of the produce marking system 20, the produce skin, which has typical skin thicknesses ranging from 40 microns to 200 microns, is etched to provide instant vaporization of 20 to 120 microns depth of the produce skin cell, i.e. approximately one-half of the skin cell thickness, at a sufficiently high energy level to cause surface vaporization, yet limited in time duration to prevent transfer of heat energy to the underlying tissues of the produce 24, subsequently preventing thermal degradation or breakdown of these tissues. The depth of the mark formed by the dot matrix printer head 132 is not to exceed one cell, however, this depth is of course dependent on the type of produce.

Also in the second and third embodiments, the dots are formed in a pattern as shown in FIG. 7 to form the identifying mark 26.

In addition, in the second and third embodiments of the produce marking system 20a, 20b, the marked produce can be swabbed as described herein with respect to the laser etching to further enhance the mark formed on the produce 24 so as to provide a visually enhanced contrast between the skin of the produce 24 and the mark 26.

The embodiments of the produce marking system 20, 20a, 20b of the present invention can be operated at high speed and are reliable and flexible. With the disclosed embodiments, only the programming of the computer needs to be changed to create a new identifying mark.

Examples of the permanent mark 26 formed on different types of produce using the laser 28 are shown in FIGS. 20-27.

While preferred embodiments of the present invention are shown and described, it is envisioned that those skilled in the art may devise various modifications of the present invention without departing from the spirit and scope of the appended claims. The invention is not intended to be limited by the foregoing disclosure.

The invention claimed is:

1. A produce marking system comprising: a piece of produce having a skin cell depth ranging from approximately 40 to 200 microns; and structure for marking a plurality of dots in said produce skin in a dot matrix pattern to form an identifying mark, said dots having a depth into said produce skin not exceeding said cell depth, said dots have a depth of approximately 20 to 120 microns so that the identifying mark formed is approximately one-half of the skin cell depth.

2. The produce marking system claim 1, wherein said structure for marking comprises a dot matrix printer head.

3. The produce marking system of claim 1, wherein said structure for marking comprises a laser which emits a high intensity light beam for marking the produce skin, said laser light beam being directed along a predetermined path along said produce skin which corresponds to said identifying mark to be applied on said produce skin.

4. The produce marking system of claim 3, wherein said laser light beam desiccates said produce skin upon contact therewith.

5. A method of marking the skins of a plurality of pieces of produce with an identifying mark comprising the steps of: providing a plurality of pieces of produce; and marking the skin of each produce in a continuous manner using a laser to emit a high intensity light beam which contacts an area of the skin of each produce by directing said laser light beam along a predetermined path along each said produce skin which corresponds to an identifying mark to be applied on said produce skin.

6. A produce marking system comprising: a piece of produce having a skin with a thickness ranging from approximately 40 to 200 microns; and a laser which emits a high intensity light beam for marking the skin of said piece of produce with an identifying mark, said laser light beam being directed along a predetermined path along said produce skin which corresponds to said identifying mark to be applied on said produce skin, the laser light beam is controlled so as to form said identifying mark on said produce skin which does not exceed approximately 20 to 120 microns of the produce skin thickness so that the identifying mark formed is approximately one-half of the skin thickness.

7. The produce marking system of claim 6, further structure for attaining relative movement between said laser and said piece of produce.

8. The produce marking system of claim 6, wherein said produce skin has a cell depth of 40 to 200 microns and said produce skin is laser marked to a depth of less than said cell depth.

9. The produce marking system of claim 8, wherein said identifying mark is formed on said produce skin because said laser light beam desiccates said produce skin.

10. The produce marking system of claim 6, further including a sorter for sorting a plurality of produce which are to subsequently be etched by said laser.

11. The produce marking system of claim 6, wherein said laser etches said produce skin by impacting said produce skin to form dots on said produce skin.

12. The produce marking system of claim 11, wherein some of said dots overlap each other to form said identifying mark.

13. A produce marking system comprising: a piece of produce; a laser which emits a high intensity light beam for marking the skin of said piece of produce with an identifying mark, said laser light beam being directed along a predetermined path along said produce skin which corresponds to said identifying mark to be applied on said produce skin; and a swabbing structure for swabbing a coloring agent onto said identifying mark to further enhance the visibility of said identifying mark.

14. The produce marking system of claim 13, wherein said coloring agent is a food coloring.

15. A produce marking system comprising: a piece of produce; a laser which emits a high intensity light beam for marking the skin of said piece of produce with an identifying mark, said laser light beam being directed along a predetermined path along said produce skin which corresponds to said identifying mark to be applied on said produce skin; said laser has a head which can be positioned at a variety of positions relative to said piece of produce; and an open-topped cup member which holds said piece of produce, said open-topped cup member including an aperture therein along one of the sides or the bottom of said cup member and said laser head is aligned with said aperture.

16. A produce marking system comprising: a piece of produce; a laser which emits a high intensity light beam for marking the skin of said piece of produce with an identifying mark, said laser light beam being directed along a predetermined path along: said produce skin which corresponds to said identifying mark to be applied on said produce skin; said laser has a head which can be positioned at a variety of positions relative to said piece of produce; and an open-topped cup member holds said piece of produce, said open-topped cup member includes an aperture therein along the bottom and said laser head is aligned with said aperture and further providing a flow of air over said laser head to carry away particles when said produce is laser etched.

17. The produce marking system of claim 16, wherein a plurality of plate members are provided between said laser head and the bottom of said cup member, each said plate member having an aperture therethrough, said apertures in said plate members being aligned with said aperture in the bottom of said cup member and said laser head being aligned with said apertures in said plate members and said aperture in the bottom of said cup member and further providing a flow of air over said laser head to carry away particles when said produce is laser etched.

18. A produce marking system comprising: a piece of produce; a laser which emits a high intensity light beam for marking the skin of said piece of produce with an identifying mark, said laser light beam being directed alone a predetermined path along; said produce skin which corresponds to said identifying mark to be applied on said produce skin; said laser has a head which can be positioned at a variety of positions relative to said piece of produce; and an open-topped cup member holds said piece of produce, said open-topped cup member includes an aperture therein along the bottom and said laser head is below said cup member and offset from said aperture, and further including a mirrored surface disposed for directing said laser light beam onto said produce sitting in said cup member.

19. The produce marking system of claim 18, wherein a flow of air is provided over said laser head to carry away particles when said produce is laser etched.

20. A produce marking system comprising: a piece of produce having a skin thickness of approximately 40 to 200 microns; and a printer head having a plurality of pins therein which, when activated will engage the produce and etch an area of the skin of the produce to form the identifying mark the pins are controlled so as to form an identifying mark in the produce skin which does not exceed approximately 20 to 120 microns of the produce skin so that the mark formed is approximately one-half of the skin thickness.

21. A produce marking system comprising: a piece of produce; and a printer head having a plurality of pins therein which, when activated, will engage the produce and etch an area of the skin of the produce to form the identifying mark, said printer head is of a dot-matrix-type including a plurality of pin members and further includes a heating element therein to generate heat to cauterize the produce skin around the etched area.

22. A produce marking system comprising: a piece of produce; a printer head having a plurality of pins therein; and a thermally conductive ribbon member between said printer head and said piece of produce such that when said pins of the printer head are activated, the pins impact the thermally conductive ribbon member which forms a hot spot on the thermally conductive ribbon member and etches an area of the skin of the piece of produce to form the identifying mark.

23. The produce marking system of claim 22, wherein said thermally conductive ribbon member is an electrically and thermally conductive foil.

24. The produce marking system of claim 23, wherein said printer head includes a heating element to generate heat to cauterize the produce skin around the etched area.

25. A method of marking the skin of a piece of produce with an identifying mark comprising the steps of: providing a piece of produce having a skin thickness of approximately 40 to 200 microns; and marking the skin of the produce using a laser to emit a high intensity light beam which contacts the area of the skin of the produce by directing said laser light beam along a predetermined path along said produce skin which corresponds to an identifying mark to be applied on said produce skin, the laser beam is controlled so as to form said identifying mark which does not exceed approximately 20 to 120 microns so that the mark formed is approximately one-half of the skin thickness.

26. The method of claim 25, wherein the step of using the laser to mark the skin of the produce comprises impacting said produce skin with said laser light beam to form dots on said skin.

27. The method of claim 26, wherein said dots overlap each other to form said identifying mark.

28. The method of claim 25, wherein said laser light beam desiccates said produce skin to form said mark.

29. A method of marking the skin of a piece of produce with an identifying mark comprising the steps of: providing a piece of produce; marking the skin of the produce using a laser to emit a high intensity light beam which contacts the area of the skin of the produce by directing said laser light beam along a predetermined path along said produce skin which corresponds to an identifying mark to be applied on said produce skin; and swabbing said produce skin around said mark with a coloring agent to enhance the visibility of the contrast between said mark and the exterior skin of the produce.

* * * * *

UNITED STATES PATENT AND TRADEMARK OFFICE
CERTIFICATE OF CORRECTION

PATENT NO. : 5,897,797
DATED : April 27, 1999
INVENTOR(S) : Greg Drouillard and Rowland W. Kanner It is certified that error appears in the above-identified patent and that said Letters Patent is hereby corrected as shown below:

Column 18, Line 39 "laser beam" should be -- laser light beam --

Signed and Sealed this

Seventh Day of December, 1999

Attest:

Q. TODD DICKINSON

*Attesting Officer*  *Acting Commissioner of Patents and Trademarks*

Disclaimer

5,897,797 — Greg Drouillard, Lakeland, FL; Rowland W. Kanner, Gunterville, AL. PRODUCE MARKING SYSTEM. Patent dated April 27, 1999. Disclaimer filed September 1, 1998, by the assignee, Atrion Medical Products Inc.

The term of this patent shall not extend beyond the expiration date of Patent No. 5,660,747.

(*Official Gazette, April 16, 2013*)